Nov. 26, 1935.   A. NIELSEN   2,022,297
CONVERTIBLE CULTIVATING AND DITCHING ELEMENT FOR CULTIVATING MACHINES
Filed Jan. 16, 1934   2 Sheets-Sheet 1

INVENTOR.
Andrew Nielsen
BY
ATTORNEY.

Nov. 26, 1935.  A. NIELSEN  2,022,297
CONVERTIBLE CULTIVATING AND DITCHING ELEMENT FOR CULTIVATING MACHINES
Filed Jan. 16, 1934  2 Sheets-Sheet 2
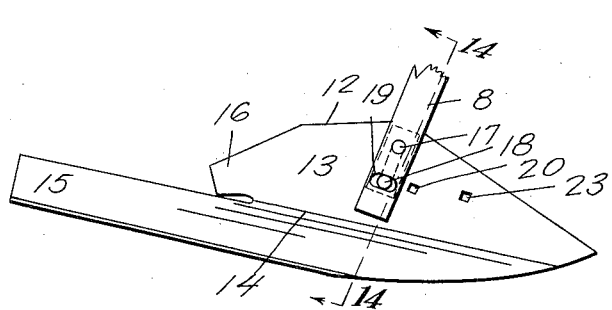
Fig. 9
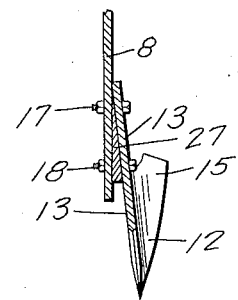
Fig. 14
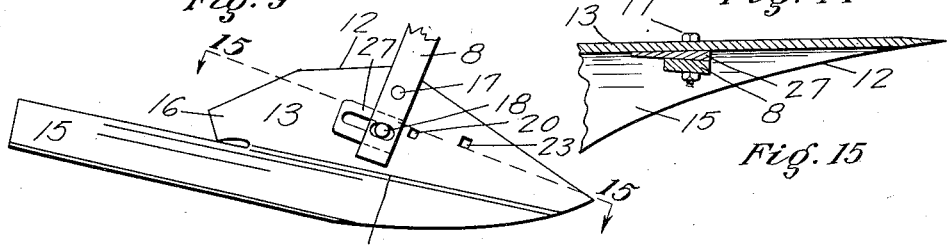
Fig. 10  Fig. 15
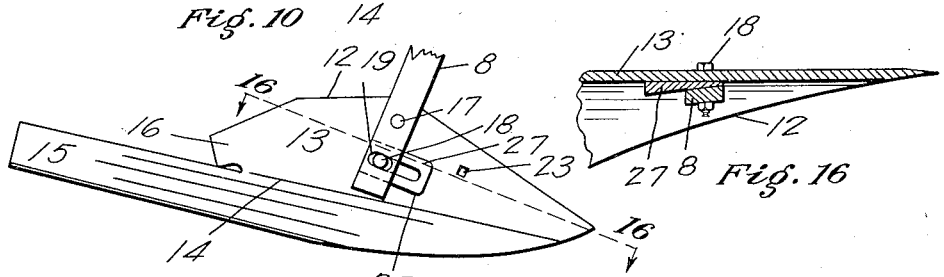
Fig. 11  Fig. 16
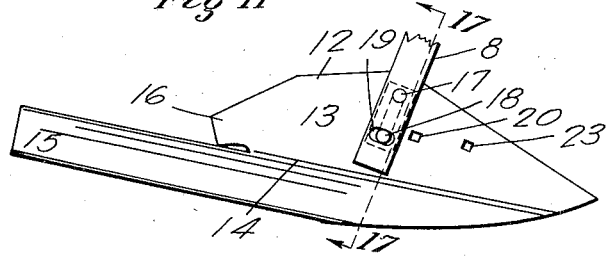
Fig. 12
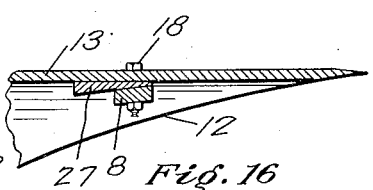
Fig. 17
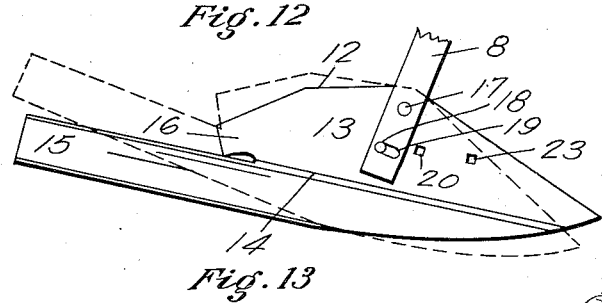
Fig. 13
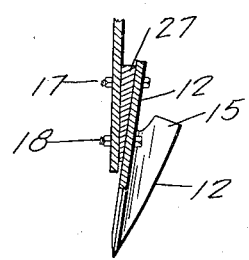
Fig. 18
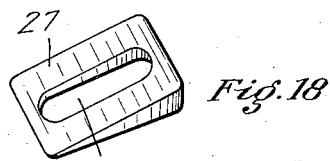
INVENTOR.
Andrew Nielsen
BY
ATTORNEY.

Patented Nov. 26, 1935

2,022,297

UNITED STATES PATENT OFFICE 2,022,297

CONVERTIBLE CULTIVATING AND DITCHING ELEMENT FOR CULTIVATING MACHINES

Andrew Nielsen, Brighton, Colo.

Application January 16, 1934, Serial No. 706,820

2 Claims. (Cl. 97—206)

My invention relates to cultivating implements, and more particularly to implements of the type used in cultivating and thinning standing crops grown in rows, such as sugar beets, beans or corn.

It is an object of the present invention to provide a cultivating implement of the above stated character capable of use in cultivating at opposite sides of the rows of plants, or in cultivating between the rows, or in ditching between the rows, or in blocking the rows, by simple adjustments of the parts comprised in the invention.

Another object is to provide in a cultivating implement a cutting blade of novel form capable of individual use as well as in association with another similar blade.

A further object resides in the provision of simple adjustments by which the depth or sweep of the cutting tool or tools comprised in the implement may be varied to selective degrees; and still other objects of the invention are to be found in details of construction and novel arrangements and combinations of parts, as will be fully explained in the course of the following description.

Figure 1:
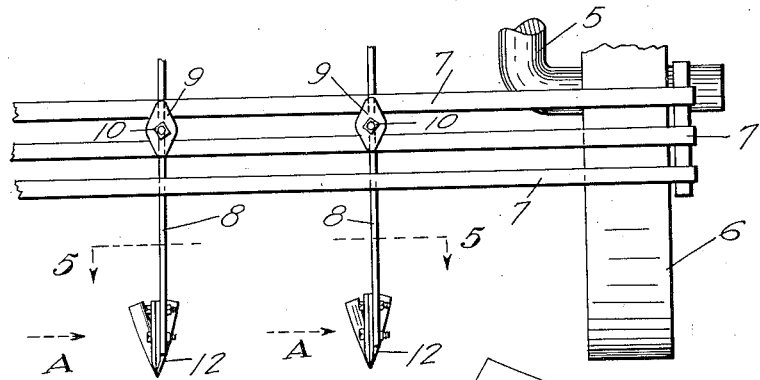
Figure 4:
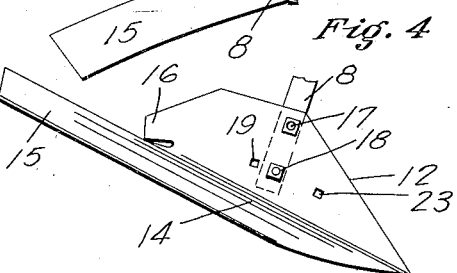
Figures 2, 3:
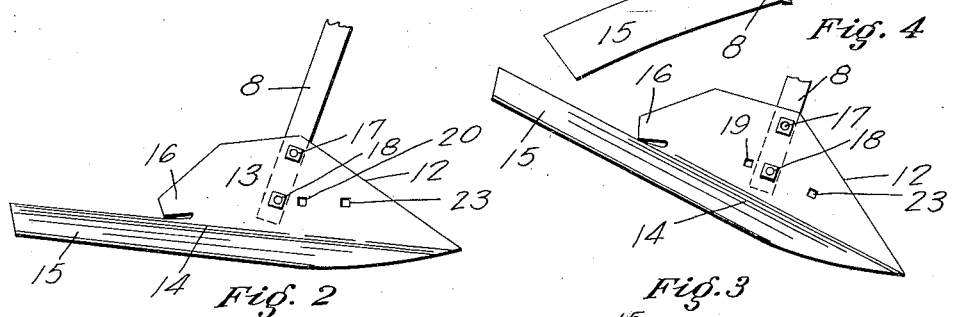
Figure 5:
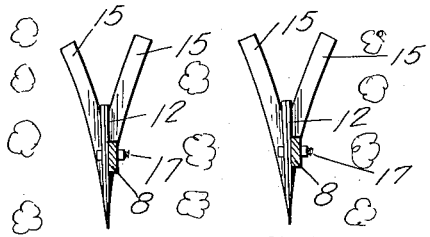
Figure 6:
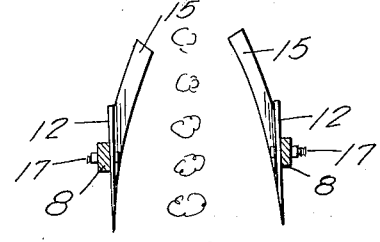
Figure 7:
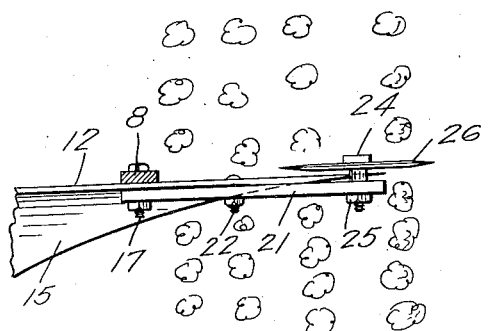
Figure 8:
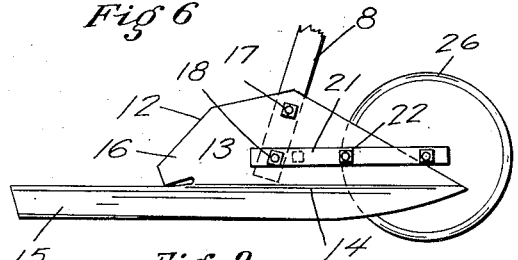

In the accompanying drawings, in the several views of which like parts are similarly designated, Figure 1 represents a fragmentary front elevation of a cultivating machine showing a pair of implements made according to the present invention in a position for cultivating the ground between rows of standing plants, Figure 2 is an enlarged side view of one of the elements looking in the direction of the arrow A in Figure 1, Figure 3 is a view similar to that of Figure 2, with the implement in the position which adapts it for ditching, Figure 4 is a plan view of the tool shown in Figure 3, Figure 5 is a section along the line 5—5 of Figure 1, Figure 6 is a similar view showing the use of single blades for cultivating at opposite sides of a row of plants, Figure 7 shows the implement as used for blocking the rows of plants, Figure 8 is a side elevation of the implement as shown in Figure 7, Figures 9 to 13 inclusive show side elevations of the implement in varying adjusted positions, Figure 14 is a section taken on the line 14—14 of Figure 9, Figure 15 is a section along the line 15—15 of Figure 10, Figure 16 is a section on the line 16—16 of Figure 11, Figure 17 is a section along the line 17—17 of Figure 12, and Figure 18 is an enlarged perspective view of the wedge-member used in effecting the adjustments illustrated in Figures 9 to 13.

Referring first to Figures 1 and 2 of the drawings, the numeral 5 designates a part of a cultivating machine of conventional construction, including wheels 6, but one of which is shown, and tool bars 7 on which the implements are mounted.

Each implement comprises a shank 8 fastened to the tool bars by means of clips 9 and bolts 10, and cutting blades 12 which are secured to the lower ends of the shanks. In the construction shown in Figure 1, two of the blades are fastened side by side at one side of the shank, while in the arrangement illustrated in Figure 6 but one blade is mounted on each shank. The first mentioned form adapts the implement for cultivating between rows of plants in the manner of a duck foot, as illustrated in Figure 5, while the other form shown in Figure 6 adapts the implement for cultivating at opposite sides of a row of plants.

The cutting blades are each composed of an upright, forwardly pointed, plate 13 bent laterally at its lower edge, as at 14, and terminating in a rearwardly extending, comparatively narrow, outwardly slanting tail 15. A shield 16 at the rear end of the plate above the tail functions in the operation to protect the plants from injury by upwardly thrown dirt.

The outer surface of the plate of each blade is flat to engage with the corresponding surface of the plate of another similar blade, when the blades are used in pairs. The blades are fastened at the lower ends of the shank by bolts 17 and 18, the lower one of which extends through a transverse slot 19 of the shank.

By these means the tilt of the blade may be changed, the upper bolt serving as a pivot about which the blade is moved while the lower bolt is loosened. This adjustment has been illustrated in full and broken lines in Figure 13 of the drawings.

Each blade has three bolt holes to receive the lower bolt in different positions and arrangements of the blade.

In the adjusted position illustrated in Figures 3 and 4, the lower bolt is placed in the hole 20 of the blade, which tilts the latter forwardly at a greater angle, thereby adapting the tool for use in ditching.

In the construction shown in Figures 7 and 8, the tool is adapted for crosswise thinning of the rows of plants after the plants have partially grown.

A bar 21 is fastened by the lower shank-bolt and by another bolt 22 passed through the hole 23 of the blade, to extend lengthwise of the blade beyond the forward edge thereof. At the projecting extremity of the bar is a stud 24, and mounted for rotation upon this stud is a sharp edged disk 26 held in place by a nut 25.

In the operation of the cultivator the implements, as shown in Figures 7 and 8, are driven crosswise of the rows of plants to thin the same. The circular cutters slice the plants with which they come in contact at the sides of the cultivator blades which subsequently remove the plants. The spaces thus produced may later on be widened by hand until but a single plant remains.

Further adjustments of the cultivator blades are effected by the use of a wedge-shaped spacer 27 shown in detail in Figure 18. This spacer has a longitudinal slot 28 to receive the bolt by which the cultivator blade is fastened at the lower end of the shank, and it is intended in use to keep the spacer permanently in place on the bolt.

By means of this spacer the blade may be tilted upwardly, as illustrated in Figures 9 and 14, it may be tilted downwardly as shown in Figures 12 and 17, or it may be inclined laterally rearwardly as in Figures 10 and 15, or laterally forwardly as in Figures 11 and 16.

What I claim and desire to secure by Letters Patent is:

1. A cultivator implement comprising a cutting blade, a shank for the blade having a transverse slot, a pivot bolt connecting the blade to the shank, a locking bolt in the transverse slot connecting the blade to the shank, and a longitudinally slotted wedge-shaped spacer on the bolt, between the shank and the blade, the locking bolt being movable in the transverse slot of the shank to permit movement of the blade about the pivot bolt, the wedge being rotatable about the locking bolt to permit tilting of the blade relative to the shank and movable in the direction of its slot and relative to the locking bolt to permit a movement of the blade toward or away from the shank.

2. A cultivator implement comprising, a cutting blade, a shank for the blade having a transverse slot, a pivot bolt connecting the blade to the shank, a locking bolt in the transverse slot connecting the blade to the shank, and means interposed between the slotted end of the shank and the blade and secured in position by the locking bolt for effecting a tilting adjustment of the blade with respect to the shank and an adjustment of the blade towards and away from the shank.

ANDREW NIELSEN.